Oct. 30, 1962     H. E. E. BARGMANN     3,061,389
CRANE SWIVEL CONNECTION
Filed May 22, 1959

Inventor
H. E. Erwin Bargmann
By
Attorney

3,061,389
CRANE SWIVEL CONNECTION
H. E. Erwin Bargmann, Bad Oeynhausen, Land Nordrhein-Westfalen, Germany
Filed May 22, 1959, Ser. No. 815,128
Claims priority, application Germany June 28, 1958
5 Claims. (Cl. 308—221)

The present invention relates to what are generally known as revolving or full circle cranes of the power shovel, dragline, clamshell, and hoisting types.

The primary object of my invention has been to provide novel means for mounting the rotating platform of a revolving crane structure on the supporting member of the vehicle, wherein the platform is rotatively supported upon ball bearings, with a one-rowed ball bearing swivel connection and with narrow vertical spaces between the rings of the swivel connection which are offset in such a way that the ball races will be broadened at the side of the rings bearing surfaces.

Another object of my invention has been to provide one of the two rings of the swivel connection in two parts which are connected to form a continuous race segment, with a groove at the joint to which a ball retainer is attached.

Another object of my invention has been to allow for unequal distances between the balls in the swivel connection.

The following detailed description and attached drawings will serve to illustrate the principles of the present invention.

Figure 1:
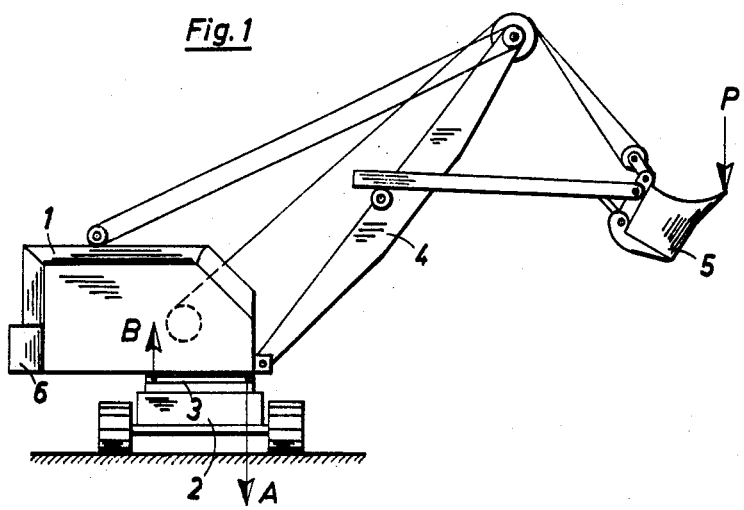
FIGURE 1 is a full-circle crane equipped with power-shovel attachment, and serves to demonstrate the forces occurring in action.
Figure 2:
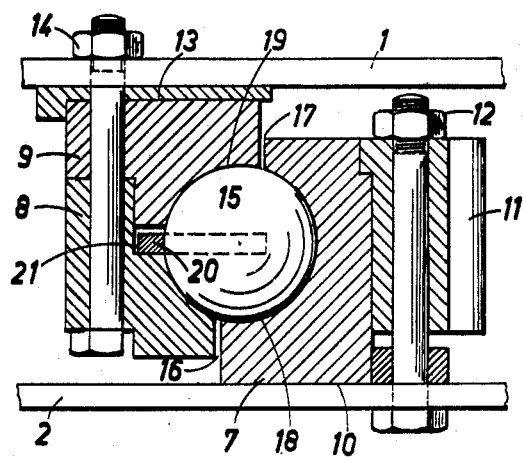
FIGURE 2 is a sectional view showing the novel ball bearing swivel connection.

It should be noted that the drawings and detailed description herein refer to an adaptation of the present invention to a so-called power crane of the shovel, dragline, or clamshell type, which usually employs a revolving crane body.

The power crane has a platform 1 which rests on the supporting member 2 through a single-rowed ball bearing swivel connection. The platform 1 supports the attachment 4—here a power shovel with dipper 5—and counterpoise 6 at the rear end. During operation of the power crane, the entire weight of the platform 1, attachment 4, 5, counterpoise 6, and the digging force P at the shovel 5 rest in the swivel connection and results in a strong vertical-downward force there. However, if the digging force is very large, the platform will tend to tilt, and force P will generate a strong vertical-downward component in front A, and a smaller vertical-upward component at the rear B. These forces create upward and downward pressure in the ball bearing swivel connection.

The novel ball bearing swivel connection is designed to bear much greater pressure downward than upward. It consists of two rings 7 and 8, 9; the bearing surface 10 of one of these rings rests on the supporting member 2 of a power crane, and is connected to it by the ring gear 11 and bolts 12, whereas the bearing surface 13 of the other ring is connected with the platform 1 to which it is attached by bolts 14.

Ring gear 11, which may have either internal or external toothing, may be in one piece with ring 7, or it may be separate from the ball bearing swivel connection and attached to the supporting member 2. The balls 15 which are inserted between the two rings, serve to center the platform 1 with reference to the supporting member 2 and to transmit downward and upward forces. Since the downward pressure is permanently active and greater than the upward pressure, which occurs only if the platform tilts, the vertical spaces 16, 17 have been positioned and offset in such a way that parts 18 and 19 of the ball race, which are at the sides of bearing surfaces 10 and 13, respectively, are broader wherever the larger pressure occurs. Spaces 16 and 17 should be as narrow as possible.

Some power cranes employ double-rowed ball bearing in the swivel connection, where one row has smaller balls and can thus bear greater downward than upward pressure; but these bearings are complex, expensive, and potential trouble spots. The new one-rowed ball bearing should therefore prove superior.

There are one-rowed ball bearing swivel connections which, like standard ball bearings, have races of equal width. These cannot bear greater pressure downward than upward and, in view of the narrow ball races, carry an enormous load. Thus they must have, for equal load, much greater dimensions than the novel bearing according to my invention.

There exists another ball bearing swivel connection which employs an offset positioning of the spaces between rings. However, assuming a horizontal position of the bearing, they are not vertical but strongly slanted. Thus the bearing cannot bear upward pressure and is consequently unfit for use in power cranes.

Only the herein described novel ball bearing swivel connection, which employs narrow vertical spaces between the rings, offers an economical design for the accommodation of unequal upward and downward pressures. Moreover, the vertical spaces are easier to manufacture.

My invention provides that the ring which is attached to the platform 1 consist of two parts 8 and 9 which, upon connection, form a continuous ball race segment. This partitioning facilitates insertion and removal of balls 15 and makes it possible to receive a ball retainer 20 within the groove 21 provided for at the joint. Bearings of this kind required a ball arrangement which provided for a spacer ball or a relatively long cylindrical distance piece between any two carrying balls. A ball retainer could not be provided because spaces 16 and 17 could not be widened without narrowing the race. The number of carrying balls was thus smaller. Through the insertion of a ball retainer 20, the distance between carrying balls can be kept quite small, hence their number can be increased; consequently, the carrying capacity of the bearing will be increased. The ball retainer 20 is of the chamber type, and may thus be designed as a solid ring to enhance its stability. It can also be carried entirely around the balls; then, to make insertion feasible, it must be designed in two parts and a groove must be provided in ring 8, 9.

Usually, the distances between balls 15 are equal. If this is the case, a rotary motion which is twice as long as the distance between balls will produce the identical state of load in the swivel connection, in that the balls occupy exactly the same position as before with reference to the ball race. Where cranes have to travel repeatedly with heavy load, the stationary balls may thus produce imprints upon the race. My invention provides unequal distances between balls 15, so that the position of balls with reference to the ball race can be as different as possible; this will increase the life of the swivel connection.

I claim as new and desire to secure by Letters Patent of the United States:

1. A turnable construction such as a power crane or the like comprising, in combination, a supporting member; a load carrying platform located above said supporting member and being turnable about a substantially vertical turning axis; and a one row ball bearing swivel connection operatively connected to said supporting member and said platform for supporting the latter turnable about said axis on said supporting member, said swivel connection including an inner ball bearing ring; an outer ball bearing ring, one of said rings being fastened to said supporting member and the other to said platform and both of said rings being formed with ball bearing races; a plurality of balls located in said ball bearing races, the faces of said rings directed toward each other being closely adjacent to each other and offset so as to form on the ring connected to said support member a wide lower race portion below the center of said balls and extending in horizontal direction farther than an upper race portion of said ring located above the center of said balls and so as to form on said ring connected to said platform a wide upper race portion above the center of said balls and extending in horizontal direction farther than a lower race portion thereof located below the center of said balls so that said swivel connection is adapted to withstand greater downwardly directed forces than upwardly directed forces, one of said rings being formed with a groove extending from the race thereof substantially normal to the axis of said ball bearing rings so as not to reduce the surfaces of said wide lower and wide upper race portions of said rings; and a ball retaining cage ring located in said groove for keeping said balls in fixed spaced relationship to each other.

2. A turnable construction such as a power crane or the like comprising, in combination, a supporting member; a load carrying platform located above said supporting member and being turnable about a substantially vertical turning axis; and a one row ball bearing swivel connection operatively connected to said supporting member and said platform for supporting the latter turnable about said axis on said supporting member, said swivel connection including an inner ball bearing ring; an outer ball bearing ring, one of said rings being fastened to said supporting member and the other to said platform and both of said rings being formed with ball bearing races; a plurality of balls located in said ball bearing races, the faces of said rings directed toward each other being closely adjacent to each other and offset so as to form on the ring connected to said support member a wide lower race portion below the center of said balls and extending in horizontal direction about twice as far as an upper race portion of said ring located above the center of said balls and so as to form on said ring connected to said platform a wide upper race portion above the center of said balls and extending in horizontal direction about twice as far as a lower race portion thereof located below the center of said balls so that said swivel connection is adapted to withstand greater downwardly directed forces than upwardly directed forces, one of said rings being formed with a groove extending from the race thereof substantially normal to the axis of said ball bearing rings so as not to reduce the surfaces of said wide lower and wide upper race portions of said rings; and a ball retaining cage ring located in said groove for keeping said balls in fixed spaced relationship to each other.

3. A turnable construction such as a power crane or the like comprising, in combination, a supporting member; a load carrying platform located above said supporting member and being turnable about a substantially vertical turning axis; and a one row ball bearing swivel connection operatively connected to said supporting member and said platform for supporting the latter turnable about said axis on said supporting member, said swivel connection including an inner ball bearing ring; an outer ball bearing ring, one of said rings being fastened to said supporting member and the other to said platform and both of said rings being formed with ball bearing races; a plurality of balls located in said ball bearing races, the faces of said rings directed toward each other being closely adjacent to each other and offset so as to form on the ring connected to said support member a wide lower race portion below the center of said balls and extending in horizontal direction farther than an upper race portion of said ring located above the center of said balls and so as to form on said ring connected to said platform a wide upper race portion above the center of said balls and extending in horizontal direction farther than a lower race portion thereof located below the center of said balls so that said swivel connection is adapted to withstand greater downwardly directed forces than upwardly directed forces, one of said rings being formed with a groove extending from the race thereof substantially normal to the axis of said ball bearing rings so as not to reduce the surfaces of said wide lower and wide upper race portions of said rings; a ball retaining cage ring located in said groove for keeping said balls in fixed spaced relationship to each other; and a ring gear arranged coaxial with and fixed to one of said ball bearing rings.

4. A turnable construction such as a power crane or the like comprising, in combination, a supporting member; a load carrying platform located above said supporting member and being turnable about a substantially vertical turning axis; and a one row ball bearing swivel connection operatively connected to said supporting member and said platform for supporting the latter turnable about said axis on said supporting member, said swivel connection including an inner ball bearing ring; an outer ball bearing ring, one of said rings being fastened to said supporting member and the other to said platform and both of said rings being formed with ball bearing races; a plurality of balls located in said ball bearing races, the faces of said rings directed toward each other being closely adjacent to each other and offset so as to form on the ring connected to said support member a wide lower race portion below the center of said balls and extending in horizontal direction farther than an upper race portion of said ring located above the center of said balls and so as to form on said ring connected to said platform a wide upper race portion above the center of said balls and extending in horizontal direction farther than a lower race portion thereof located below the center of said balls so that said swivel connection is adapted to withstand greater downwardly directed forces than upwardly directed forces, one of said rings being formed of two parts connected together so as to form between themselves a groove extending from the race of said one ring substantially normal to the axis of said ball bearing rings so as not to reduce the surfaces of said wide upper and wide lower race portions of said rings; and a ball retaining cage ring located in said groove for keeping said balls in fixed spaced relationship to each other.

5. A turnable construction such as a power crane or the like comprising, in combination, a supporting member; a load carrying platform located above said supporting member and being turnable about a substantially vertical turning axis; and a one row ball bearing swivel connection operatively connected to said supporting member and said platform for supporting the latter turnable about said axis on said supporting member, said swivel connection including an inner ball bearing ring; an outer ball bearing ring, one of said rings being fastened to said supporting member and the other to said platform and both of said rings being formed with ball bearing races; a plurality of balls located in said ball bearing races, the faces of said rings directed toward each other being closely adjacent to each other and offset so as to form on the ring connected to said support member a wide lower race portion below the center of said balls and extending in horizontal direction farther than an upper race portion of said ring located above the center of said balls and so as to form on said ring connected to said platform a wide upper race portion above the center of said balls and extending in horizontal direction farther than a lower race portion thereof located below the center of said balls so that said swivel connecion is adapted to withstand greater downwardly directed forces than upwardly directed forces, one of said rings being formed with a groove extending from the race thereof substantially normal to the axis of said ball bearing rings so as not to reduce the surfaces of said wide lower and wide upper race portions of said rings; and a ball retaining cage ring located in said groove and having spacers of unequal width between said balls so as to keep said balls spaced different distances from each other.

References Cited in the file of this patent

UNITED STATES PATENTS

| | | |
|---|---|---|
| 1,798,634 | Schafer | Mar. 31, 1931 |
| 2,220,027 | Scott | Oct. 29, 1940 |
| 2,313,084 | Manly | Mar. 9, 1943 |
| 2,686,397 | Annen | Aug. 17, 1954 |
| 2,704,230 | Roschlau | Mar. 15, 1955 |
| 2,711,938 | Herrmann | June 28, 1955 |

FOREIGN PATENTS

| | | |
|---|---|---|
| 447,966 | Great Britain | May 28, 1936 |
| 272,975 | Switzerland | Apr. 2, 1951 |